US008700940B2

(12) United States Patent
Dong

(10) Patent No.: US 8,700,940 B2
(45) Date of Patent: Apr. 15, 2014

(54) SMART CARD ABLE TO RENEGOTIATE THE MAXIMUM POWER SUPPLIED TO THE SMART CARD FROM A MOBILE DEVICE

(75) Inventor: Olivier Dong, Berkshire (GB)

(73) Assignee: NEC Corporation, Tokyo (JP)

( * ) Notice: Subject to any disclaimer, the term of this patent is extended or adjusted under 35 U.S.C. 154(b) by 82 days.

(21) Appl. No.: 13/142,778

(22) PCT Filed: Dec. 22, 2009

(86) PCT No.: PCT/JP2009/071852
§ 371 (c)(1),
(2), (4) Date: Jun. 29, 2011

(87) PCT Pub. No.: WO2010/076888
PCT Pub. Date: Jul. 8, 2010

(65) Prior Publication Data
US 2011/0276819 A1 Nov. 10, 2011

(30) Foreign Application Priority Data
Jan. 5, 2009 (GB) .................................. 0900076.1

(51) Int. Cl.
*G06F 1/00* (2006.01)
*G06F 11/30* (2006.01)
*G06F 1/26* (2006.01)
*G06F 1/32* (2006.01)

(52) U.S. Cl.
USPC ............................ 713/340; 713/320; 713/300

(58) Field of Classification Search
USPC ................................................ 713/340, 300
See application file for complete search history.

(56) References Cited

U.S. PATENT DOCUMENTS

| 7,155,625 | B2 * | 12/2006 | Cohen et al. ................... 713/340 |
| 7,401,236 | B2 | 7/2008 | Adachi |
| 7,922,091 | B2 | 4/2011 | Deprun et al. |
| 2005/0120250 | A1 * | 6/2005 | Adachi .......................... 713/300 |
| 2006/0117195 | A1 * | 6/2006 | Niwa et al. ..................... 713/300 |
| 2006/0226243 | A1 * | 10/2006 | Dariel ............................ 235/492 |
| 2007/0210174 | A1 | 9/2007 | Deprun et al. |
| 2008/0204241 | A1 * | 8/2008 | Di. Zettler ................. 340/572.1 |
| 2010/0033310 | A1 * | 2/2010 | Narendra et al. .......... 340/10.51 |
| 2010/0131790 | A1 * | 5/2010 | Zhang et al. ................... 713/340 |

FOREIGN PATENT DOCUMENTS

| CN | 100419634 | 9/2008 |
| CN | 101273369 | 9/2008 |
| JP | 5-313794 | 11/1993 |

(Continued)

OTHER PUBLICATIONS

International Search Report, PCTJP2009/071852, Mar. 9, 2010.

(Continued)

*Primary Examiner* — Thomas Lee
*Assistant Examiner* — Robert Cassity
(74) *Attorney, Agent, or Firm* — Young & Thompson

(57) ABSTRACT

A mobile device is provided having a smart card. The smart card is powered by the mobile device and a maximum power supply value is defined by the mobile device to control the power drawn by the smart card. Provision is made for the smart card or the mobile device to renegotiate the maximum power supply level for the smart card without having to reset the mobile device. This provides the mobile device with dynamic control of the power drawn by the smart card, which can help the mobile device to optimize the power saving management.

13 Claims, 3 Drawing Sheets

(56) References Cited

FOREIGN PATENT DOCUMENTS

| | | |
|---|---|---|
| JP | 7-141069 | 6/1995 |
| JP | 10-049261 | 2/1998 |
| JP | 2004-86359 | 3/2004 |
| JP | 2005-267370 | 9/2005 |
| JP | 2005-303790 | 10/2005 |
| JP | 2007-242024 | 9/2007 |
| WO | WO 2004/070593 | 8/2004 |
| WO | WO 2005/022369 | 3/2005 |
| WO | WO 2006/123315 | 11/2006 |
| WO | WO 2008/044597 | 4/2008 |

OTHER PUBLICATIONS

Chinese Official Action—200980153928.0—Jul. 2, 2013.
Japanese Official Action—2011-526160—Jan. 22, 2014.

* cited by examiner

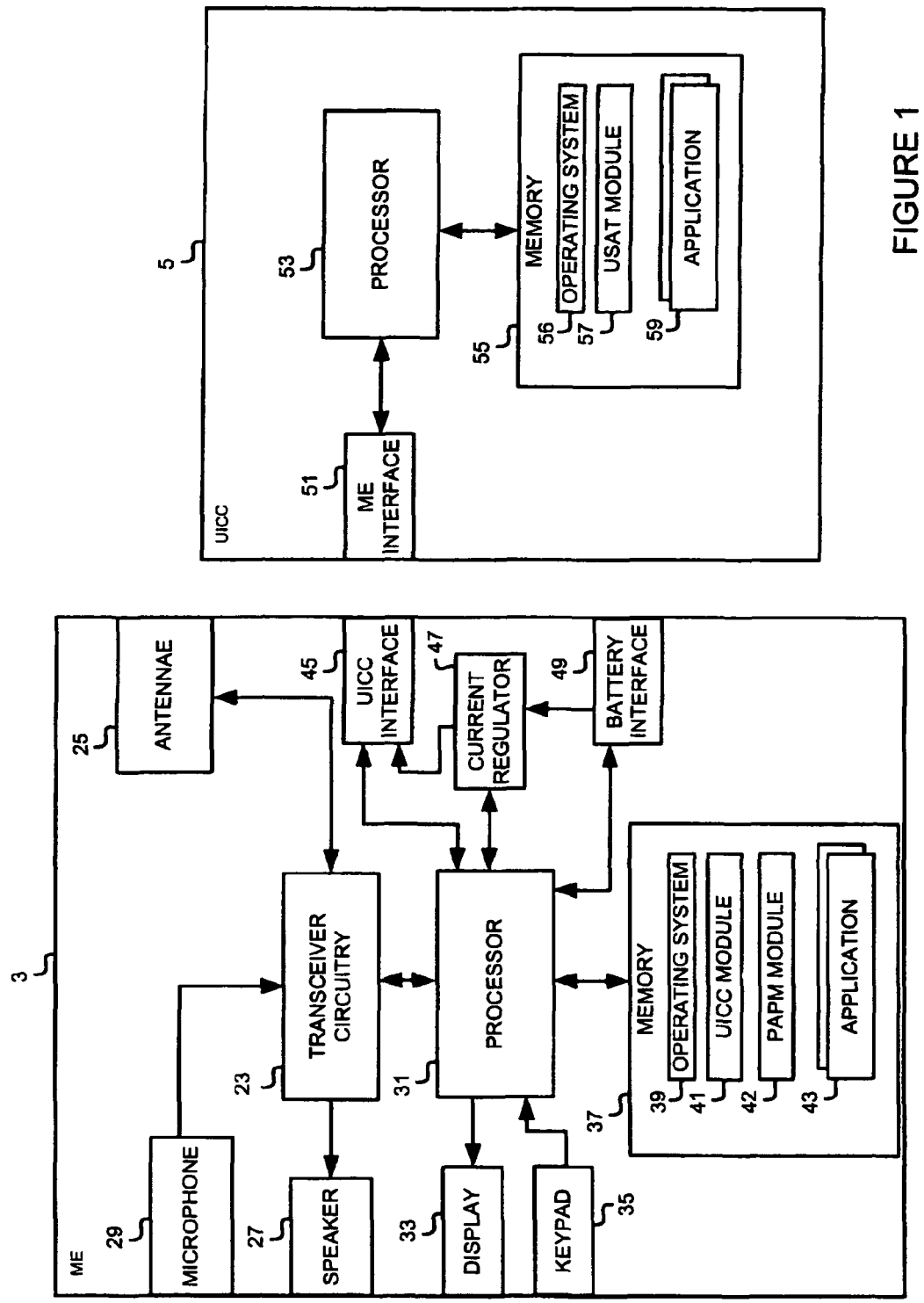

SMART CARD ABLE TO RENEGOTIATE THE MAXIMUM POWER SUPPLIED TO THE SMART CARD FROM A MOBILE DEVICE

TECHNICAL FIELD

The present invention relates to communications equipment and in particular to mobile equipment (ME) having a Universal Integrated Circuit Card (UICC) therein and the way in which power requirements are negotiated between the ME and the UICC. The invention also relates to the mobile equipment, the UICC and to the methods performed therein.

BACKGROUND ART

MEs such as mobile telephones include a UICC which, among other things, holds secure data for identifying the user to the core network. The UICC is a smart card that has an inbuilt microprocessor and memory which can run a number of software applications. The UICC is powered by the battery within the ME. The standards setting Organisation ETSI is in the process of finalising Release 7 of its standards documents (including TS 102 221, TS 102 600 and TS 102 223) relating to the interaction between the ME and its UICC. This standards documentation specifies that the ME negotiates the maximum power supply that will be available to the UICC before any applications are selected/activated when the ME is powered up. Once defined, this maximum value is fixed until the ME is reset and, until then, the UICC is free to draw the specified maximum power at any time. The inventors have realised that this arrangement is less than optimal and can shorten the battery lifetime significantly.

DISCLOSURE OF THE INVENTION

The present invention proposes an alternative approach in which the power requirements of the UICC can be renegotiated dynamically during an active UICC application session without resetting the system.

According to one aspect, the present invention provides a mobile device comprising: an interface for receiving a smart card; a processor operable to define a (non-zero) maximum power supply value for the smart card and to inform the smart card of the maximum power supply value; and a power circuit operable for providing power to the smart card via said interface, up to the defined maximum power supply value; wherein the processor is operable to change the maximum power supply value for the smart card and to inform the smart card of a new (non-zero) maximum power supply value. In this way, the maximum power supply value (typically a maximum value of electrical current) for the smart card can be dynamically changed as circumstances change in the mobile device (for example if battery power becomes low) or if circumstances change in the smart card (for example if existing processes are to be terminated or if new processes are to be run on the smart card).

This allows the ME to optimize the UICC's power consumption by:
  providing more power to the UICC when it is really needed
    (eg applications requiring intensive processing on the UICC side, applications often accessing high density memory in the UICC, applications generating a lot of data traffic on the ME/UICC interface, etc
  reducing the UICC power consumption in case of:
    basic UICC applications operation (e.g. sending/receiving APDU)
    higher priority applications operations on the ME side (save the power for these ME applications)
    battery almost flat
    etc One of the main advantages with the above approach is that the ME is given real control of the UICC power consumption during an active UICC application session.

The processor may renegotiate the maximum power value with the smart card or it may define the new maximum power supply value without negotiation. When there is negotiation, the negotiation may be initiated by the smart card or by the mobile device. The mobile device may include means for monitoring a remaining power level of a battery that provides power to the mobile device and may trigger the renegotiation in response to the monitored remaining power level of said battery (for example when it falls below a threshold amount). The mobile device may also have means for monitoring the operation of the smart card and may trigger the renegotiation in response to the monitored operation of the smart card. The monitoring means may for example monitor if processes running on the smart card are generating a lot of data traffic over the interface.

When the smart card receives a new maximum power supply value from the mobile device, the smart card may request additional time to use the existing maximum power supply value (for example to give it time to terminate processes running on the smart card), in which case the mobile device will grant or deny the requested additional time. If the request for additional time is allowed, then the new maximum power supply value will be imposed after the additional time has expired.

Where the smart card initiates the renegotiation, the received request may include details of processes to be run on the smart card and an indication of their power demands. In this case, the processor may determine whether or not to provide the requested new maximum power supply value in dependence upon the power demands and the remaining power level of the battery that provides power to the mobile device (and hence to the smart card).

The switch over from the existing maximum power supply value to the new maximum power supply value is preferably performed after the smart card sends an accept message to the mobile device.

The present invention also provides a smart card operable with a mobile device, the smart card comprising: an interface for interfacing with the mobile device; and a processor operable to receive a maximum power supply value from the mobile device and operable to make processes run on the smart card within the power range supplied by the mobile device; wherein the processor is operable to receive a changed maximum power supply value from the mobile device and, in response, is operable to make processes running on the smart card within the new power range supplied by the mobile device.

The present invention also provides a method performed by a mobile device, the method comprising: defining a maximum power supply value for a smart card associated with the mobile device; informing the smart card of the maximum power supply value; controlling power supplied to the associated smart card so that the supplied power does not exceed the defined maximum power supply value; changing the maximum power supply value for the associated smart card; informing the associated smart card of the new maximum power supply value; and changing said controlling step so that the power supplied to the associated smart card does not exceed the new maximum power supply value.

The present invention also provides a method performed by a smart card operable with a mobile device, the method comprising: receiving a maximum power supply value from the mobile device; drawing power from the mobile device to run processes on the smart card within the power range supplied by the mobile device; receiving a changed maximum power supply value from the mobile device and making processes running on the smart card run within the new power range supplied by the mobile device.

The present invention also provides computer implementable instructions for carrying out the above methods. The instructions may be provided on a recording medium such as a CD-ROM or the like.

Another aspect of the invention provides a mobile device for use with an associated smart card, the device comprising: a smart card interface for interfacing with the smart card; a power supply interface for interfacing with a power supply; a power supply control circuit coupled between said smart card interface and the power supply interface for controlling the power provided to the smart card so that it does not exceed a defined maximum power supply value; and a processor operable to control the power supply control circuit to dynamically change the maximum power supply value.

BRIEF DESCRIPTION OF THE DRAWING

These and other aspects of the invention will become apparent from the following detailed description of exemplary embodiments described with reference to the accompanying drawings in which:

FIG. 1 is a block diagram illustrating the main components of a ME and a UICC;

Figure 3:
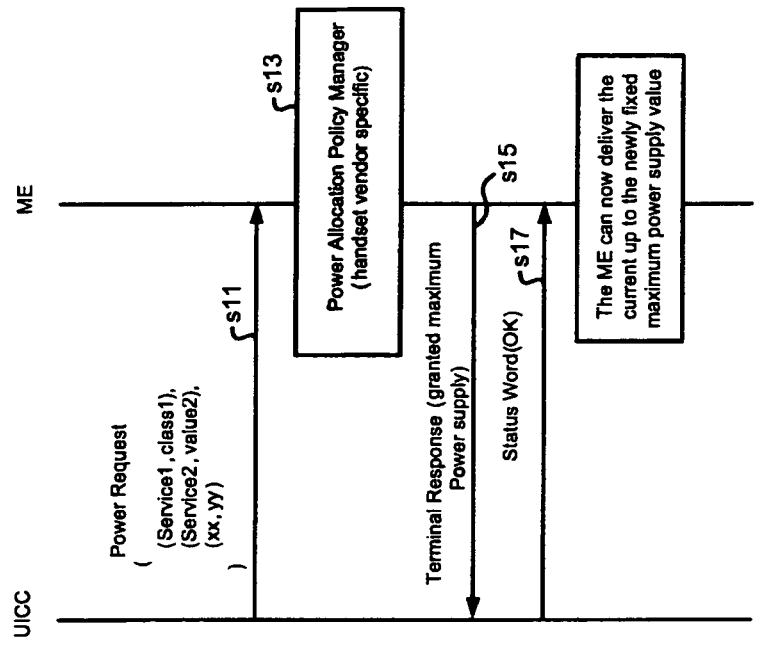
FIG. 3 is a communications timing diagram illustrating communications between the ME and the UICC when the UICC wants to initiate power supply renegotiation.

BEST MODE FOR CARRYING OUT THE INVENTION (Overview)

As will be explained in more detail below, the main idea of this embodiment is to introduce a mechanism allowing the UICC and the ME (in this embodiment a cellular telephone) to renegotiate the maximum UICC power consumption value dynamically during an active UICC application (e.g. USIM application) session without resetting the system.

This can allow the ME to optimize the UICC power consumption by:
providing more power to the UICC when it is really needed (e.g. applications requiring intensive processing on the UICC side, applications often accessing the high density memory in the UICC, applications generating a lot of data traffic over the ME/UICC interface, etc)
reducing the UICC power consumption in case of:
basic UICC applications operations (e.g. sending/receiving APDU)
higher priority applications on the ME side (save the power for these ME applications)
battery almost flat
etc Embodiments Embodiments of the present invention will be described referring to the accompanying drawings.

FIG. 1 is a block diagram showing the main components of the ME 3 and the UICC 5 used in this embodiment.

As shown, the ME includes a transceiver circuit 23 which is operable to transmit signals to and to receive signals from a remote base station via one or more antennae 25. As shown, the transceiver circuit is connected to a loudspeaker 27 and a microphone 29 in the normal way to allow the user to make and receive calls. The ME also includes a processor 31 for controlling the operation of the ME and for controlling the user interaction with the ME via display 33 and a keypad 35. The processor 31 operates in accordance with software instructions stored within memory 37. As shown, these software instructions include, among other things, an operating system 39, a UICC module 41, a Power Allocation Policy Manager (PAPM) module 42 and a number of application modules 43. In this embodiment, the UICC module 41 is for controlling the interaction between the ME 3 and the UICC 5. Although the UICC module 41 and the PAPM module 42 are shown as a separate software modules in the ME 3, in other embodiments, they may be provided as part of the operating system 39. The ME 3 also includes a UICC interface 45 which provides the physical interface to the UICC 5; a current regulator 47 which provides a regulated power supply to the UICC through the UICC interface 45; and a battery interface 49 which connects the ME to its battery (not shown). As will be described in more detail below, the PAPM module 42 controls the current regulator 47 to define the maximum power to be made available to the UICC 5. When determining this maximum power value, the PAPM module 42 will consider, among other things, the remaining charge in the connected battery. The Battery interface 49 is therefore connected to the processor 31 to allow the PAPM module 42 make this determination.

As shown in FIG. 1, the UICC 5 includes a ME interface 51 for providing the physical interface to the ME 3. The UICC 5 also includes a processor 53 which operates in accordance with software instructions stored in memory 55. As shown, these software instructions include an operating system 56, a USAT module 57 (Universal SIM (subscriber Identity Module) Application Toolkit) and a number of applications 59. The USAT module 57 provides mechanisms which allow the applications 59 to interact and operate with the ME 3 or a remote entity in the network which supports the specific mechanism(s) required by the application.

(Operation)

The operation of the ME 3 and the UICC 5 will now be described with reference to FIGS. 2 to 5.

Figure 2:
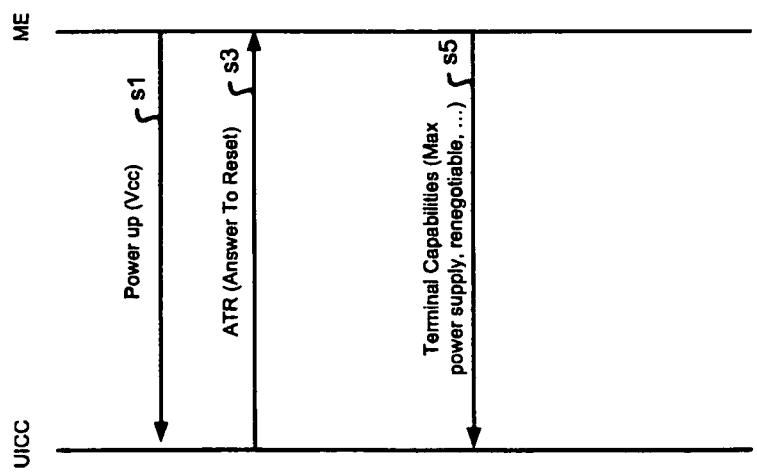
FIG. 2 is a communications timing diagram illustrating communications between the ME and the UICC just after the ME is powered up.

As shown in FIG. 2, at the time of power up, the ME 3 will supply, in step s1, Vcc to the UICC 5 and in response, the UICC 5 will provide, in step s3, its ATR (Answer to Reset) message to the ME 3. The ATR message contains a list of features supported by the UICC 5, such as HSP (USB), secure channel, secure APDU. In this embodiment, the ATR message will include a parameter informing the ME 3 whether or not the UICC 5 can perform dynamic renegotiation of the maximum available power supply value. Then in step s5, the ME 3 informs the UICC 5 of its capabilities by sending it a Terminal Capabilities message. This message will initially set the maximum available power supply value and if the ME 3 can perform dynamic renegotiation of the maximum available power supply value, then the Terminal Capabilities message will also include a parameter informing the UICC 5 of this capability. This may be done, for example, by updating the coding of the current P1 or P2 parameters (which are both defined to be "00" in the Terminal Capabilities command defined prior to the present invention).

Coding of P1 or P2

| b8 | B7 | b6 | b5 | b4 | b3 | B2 | b1 | Meaning |
|----|----|----|----|----|----|----|----|---------|
| 0 | 0 | 0 | 0 | 0 | 0 | 0 | 0 | Maximum available Power supply not negotiable |
| 0 | 0 | 0 | 0 | 0 | 0 | 0 | 1 | Maximum available Power supply renegotiable |

(UICC Initiated Renegotiation)

During normal use, the UICC 5 will run applications 59 and operate in accordance with its operating system 55. In the event that an application 59 requiring more power than the currently provided power in order to simply run or to run in an optimised way is to be launched on the UICC 5, then the operating system 55 causes the USAT module 57 to generate and output a new command which, as shown in step s11 in FIG. 3, is sent to the ME 3. This new command (Power Request) enumerates the services/applications to be run together with their desired power value (e.g. 30 mA for application 1, 40 mA for application 2 etc) and/or power consumption class (which defines a range of power consumption values, e.g. 30 to 40 mA).

New Proactive Command: "Power Request":

| Description | Clause | M/O/C | Min | Length |
|---|---|---|---|---|
| Proactive UICC command Tag | 9.2 | M | Y | 1 |
| Length (A + B + C) | — | M | Y | 1 or 2 |
| Command details | 8.6 | M | Y | A |
| Device Identities | 8.7 | M | Y | B |
| Service Power | 8.XX | M | Y | C |

Note:
this table is formatted like other existing proactive commands as defined in ETSI TS 102 223 (current version 8.1.0) to which the reader is referred for a further description of "M/O/C", "min", etc.

The new Power Request command will comprise the following parameters:
Proactive UICC command Tag='D0' as defined in TS 102 223
Length=total data length of the rest of the command
Command Details which include a new value for the "Type of Command" field:
Type of command=0x71=Power Request
Note: 0x71 is given as an example, any other free (relevant) values could be used
Device Identities as defined in clause 8.7 in TS 102 223
Service Power with the following coding:

| Byte(s) | Description | Length |
|---|---|---|
| 1 | Service Power tag | 1 |
| 2 | Length | 1 or 2 |
| 3 | Service Power BER TLV | 1 |

Service Power Tag='53' or 'D3' (given as an example, any other free (relevant) values could be used)

Length=total length of the Service Power BER TLV
Service power BER-TLV coding
Service Name tag=0x55 (any other available values could be used)
Service Name length=the total length of the following data
Required power class or value: '01' to '09' indicates a class, '0A' to '64' indicates a hexadecimal value in mA (coded in the first byte following the "Service Name length" field)
Service Name: text string If there are several service/class or service/value couples, the BER TLV can be coded as follows:

| Service Name tag = '55' | (Length of Service Name 1) + 1 | Power class 1 or value 1 (1 byte) | Service Name 1 | Service Name tag = '55' | (Length of Service Name 2) + 1 | Power class 2 or value 2 (1 byte) | Service Name 2 | ... |
|---|---|---|---|---|---|---|---|---|

Several classes of Power supply may be defined. It is proposed to define some as follows (but others are possible):
Class 1: 10-20 mA
Class 2: 20-30 mA
Class 3: 30-40 mA
Class 4: 40-50 mA
Class 5: 50-60 mA
Class 6: 60-70 mA
Class 7: 70-80 mA
Class 8: 80-90 mA
Class 9: 90-100 mA Upon receiving this Power Request command, the UICC module 41 in the ME 3 invokes the Power Allocation Policy Manager (PAPM) module 42 which makes a decision, in step s13, about whether or not the requested power can be supplied to the UICC 5. When making this determination, the PAPM module 42 will typically consider the remaining battery charge and the priority of any applications 43 being run on the ME 3. The PAPM module 42 informs the UICC module 41 of its decision and identifies a new maximum available power supply value. The UICC module 41 then sends, in step s15, the UICC 5 a Terminal Response identifying the new maximum power supply value.

Terminal Response:

| Description | Clause |
|---|---|
| Command details | 8.6 |
| Device identities | 8.7 |
| Result | 8.12 |

The "Result" data object will include in its "Additional Information" field for the Power Request command as described below, the newly allocated maximum available power supply value.

(Additional Information for Power Request)

For the general result "Command performed successfully", the ME 3 will provide additional information, the first byte of which is defined below:
'0A' to '64'=maximum available power supply (hexadecimal value) in mA Note: the detail of the parameters in the Terminal Response is defined in ETSI TS 102 223 and the clauses in the table above also refer to this same specifications document.

Upon receiving the Terminal Response, the USAT module 57 responds, in step s17, with an appropriate status word acknowledgement. The UICC module 41 then informs the PAPM module 42 of the acknowledgement so that it can control the current regulator 47 so that the ME 3 can deliver the current up to the newly defined maximum power supply value.

If the PAPM module 42 determines that there is not sufficient power for the requested UICC applications, then the new maximum power supply value will be the same as the previous value. If the PAPM module 42 determines that there is sufficient power to meet the request from the UICC 5, then the new maximum power supply value will be provided to the UICC 5 which will run all the desired applications accordingly.

(ME Initiated Renegotiation)

During normal use, the PAPM module 42 may monitor (in step s21 shown in FIG. 4a) the remaining charge of the attached battery and determine according to its programming whether or not to change the maximum power supply value supplied to the UICC 5. The policy underlying this determination may be made in a number of different ways. As one example, each time the remaining charge falls below a number of reducing threshold values, the PAPM module 42 may decide to reduce the maximum power supply value to be allocated to the UICC 5. When a decision is made to change the maximum power supply value, the PAPM module 42 will trigger the UICC module 41 to initiate a renegotiation of the maximum power supply value provided to the UICC 5. The ME's operating system 39 may also monitor (in step s23) the activities of the UICC 5 and trigger the UICC module 41 to initiate a renegotiation of the maximum power supply value if, for example, the current UICC activities don't require the currently supplied value or if it detects that higher priority applications are being or are about to be run on the ME 3. In either case, the UICC module 41 is triggered to generate and send, in step s25, a Power Management command. This command may be a new APDU command or it may be a re-use of the Terminal Capability APDU command in which the ME 3 indicates the new maximum power supply value. The command may, if desired, include the reason(s) for the change. In this embodiment, the following new APDU command is defined in order to allow the ME 3 to change the maximum available power supply value.

New APDU command: "Power Management":

| Code | Value |
| --- | --- |
| CLA | As specified in clause 10.1.1 in TS 102 221 |
| INS | 0xAB (value given as example) |
| P1 | 00 |
| P2 | 00 |
| Lc | Length of the subsequent data field |
| Data | The first Byte must contain the new maximum available power supply value. The rest of the data could optionally include the reason why the ME initiated the negotiation |
| Le | Not present |

Upon receiving the command, the UICC 5 may either directly accept the new value and send, in step s27, the 0x9000 status words to the ME 3; or it can ask the ME 3 for an additional period of time in order for it to terminate any ongoing operations that would be preferably run using the currently granted maximum power supply value. The UICC 5 may ask for the additional period of time by returning the 0x92XX status words with XX=additional time requested in seconds (hexadecimal value). Any other status words may be ignored by the ME and in this case, the ME 3 may directly apply the change.

If the new value is accepted by the UICC 5, then the ME 3 will set the new maximum power supply value for the UICC in step s29. If the UICC 5 requests more time, then the UICC module 41 can allow the UICC 5 to finish the ongoing operations using the existing maximum power supply value. In this case, the UICC module 41 will send the same Power Management command once the time period asked by the UICC 5 has expired (and the UICC 5 must then accept the command at that time by sending the 0x9000 status words).

Figure 4B:
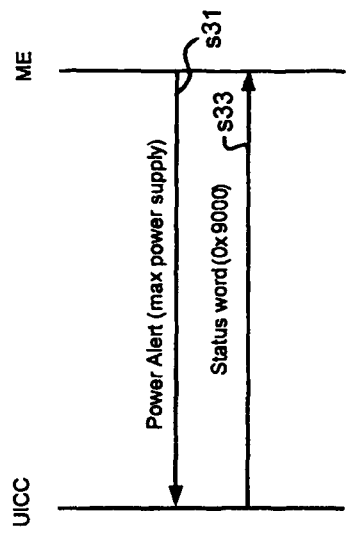
FIG. 4b is a communications timing diagram illustrating communications between the ME and the UICC when the ME wants to force a maximum available power supply without negotiation.
Figure 4A:
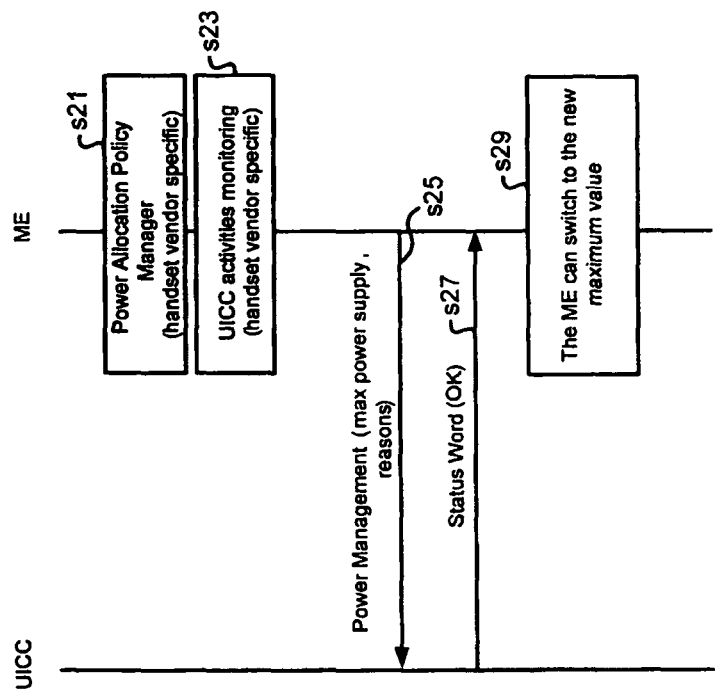
FIG. 4a is a communications timing diagram illustrating communications between the ME and the UICC when the ME wants to initiate power supply renegotiation.

The UICC module 41 can also reject the request for additional time and, in that case, it will send a new command Power Alert (shown in step s31 in FIG. 4b) to the UICC 5 informing the UICC 5 that the new maximum power supply value will be imposed by the ME 3 without negotiation with the UICC 5. This command may be used, for example, when the battery level is low and the ME 3 wants to save the remaining power as much as possible for ME operations by decreasing the power allocated to the UICC 5. As shown in FIG. 4b, upon receiving this Power Alert command, the UICC 5 will internally prepare for the change and will accept the new value by returning, in step s33, the 0x9000 status words. The ME 3 may set the new maximum power supply level after receiving the acceptance or after sending the Power Alert command.

New APDU command: "Power Alert":

| Code | Value |
| --- | --- |
| CLA | As specified in clause 10.1.1 in TS 102 221 |
| INS | 0xAC (value given as example) |
| P1 | 00 |
| P2 | 00 |
| Lc | 1 byte |
| Data | the new maximum available power supply value |
| Le | Not present |

Modifications and Alternatives

A detailed embodiment has been described above. As those skilled in the art will appreciate, a number of modifications and alternatives can be made to the above embodiment whilst still benefiting from the inventions embodied therein.

In the above embodiment, a mobile telephone based telecommunications system was described. As those skilled in the art will appreciate, the techniques described in the present application can be employed in other communications system. Other communications nodes or devices may include user devices such as, for example, personal digital assistants, portable telephones, laptop computers etc.

In the above embodiments, a number of software modules were described. As those skilled will appreciate, the software modules may be provided in compiled or un-compiled form and may be supplied to the UICC or to the ME as a signal over a computer network, or on a recording medium. Further, the functionality performed by part or all of this software may be performed using one or more dedicated hardware circuits. However, the use of software modules is preferred as it facilitates the updating of the UICC 5 and of the MEs 3 in order to update their functionalities.

In the above embodiment, the UICC interfaced with the ME via respective interfaces on each device. As those skilled in the art will appreciate, these interfaces may be physical (contact) type interfaces or they may by wireless (non-contact) type interfaces.

In the above embodiment, the Power Alert command was used if the ME decides not to accept the UICC's request for additional time with the existing maximum power supply value. As those skilled in the art will appreciate, this Power Alert command can be used at any time, if the ME wishes to force a new maximum power supply value on the UICC.

In the above embodiment, a current regulator was provided to control the maximum power supply value provided to the UICC. As those skilled in the art will appreciate, other control circuits can be used to achieve the same result. For example, where the interface is a non-contact interface, the power control circuit may limit the magnitude of a magnetic or electric field generated to power the UICC.

As those skilled in the art will appreciate, the currently proposed solution could be implemented independently from any UICC-ME physical interface considerations, i.e. it works over both the USB interface as defined in TS 102 600 or the legacy interface as defined in TS 102 221. In case the USB interface is activated between the ME and the UICC, all the new APDU and proactive commands defined in this proposal will be applicable using the Smart Card ICCD interface class as defined by USB forum. In case the legacy interface is activated between the ME and the UICC, all the new APDU and proactive commands defined in this proposal will be directly applicable like other commands as defined in TS 102 221 and TS 102 223.

It is also to be noted that the solution could be extended in order to be applicable over the USB EEM (Ethernet Emulation Mode) interface class. The way in which in this would be achieved will be apparent to those skilled in the art and so a detailed description will not be given here.

Various other modifications will be apparent to those skilled in the art and will not be described in further detail here.

Examples

An example 1 describes a mobile device, comprising:
an interface for a smart card;
a processor operable to define a maximum power supply value for the smart card and to inform the smart card of the maximum power supply value; and
a power circuit operable for providing power to the smart card, up to the defined maximum power supply value;
wherein the processor is operable to change the maximum power supply value for the smart card and to inform the smart card of the new maximum power supply value and wherein said power circuit is operable to provide power to the smart card up to the new maximum power supply value.

An example 2 describes a mobile device according to example 1, wherein the processor is operable to renegotiate the maximum power value with the smart card.

An example 3 describes a mobile device according to example 2, wherein the processor is operable to trigger the renegotiation of the maximum power supply value.

An example 4 describes a mobile device according to example 3, wherein the mobile device includes means for monitoring a remaining power level of a battery that provides power to the mobile device and wherein said processor is operable to trigger the renegotiation in response to the monitored remaining power level of said battery.

An example 5 describes a mobile device according to example 3 or 4, comprising means for monitoring the operation of the smart card and wherein said processor is operable to trigger the renegotiation in response to the monitored operation of the smart card.

An example 6 describes a mobile device according to any one of examples 3 to 5, wherein the processor is operable, in response to informing the smart card of the new maximum power supply value, to receive a request from the smart card for additional time using the existing maximum power supply value and wherein the processor is operable to grant or deny the requested additional time.

An example 7 describes a mobile device according to example 6, wherein said processor is operable to control said power circuit so that the power circuit provides the smart card with power up to the new maximum power supply value after the requested additional time.

An example 8 describes a mobile device according to example 2, wherein said processor is operable to renegotiate the maximum power supply value in response to a request received from the smart card.

An example 9 describes a mobile device according to example 8, wherein the received request includes details of processes to be run on the smart card and an indication of their power demands and wherein the processor is operable to determine whether or not to provide the requested new maximum power supply value in dependence upon the power demands and a remaining power level of a battery that provides power to the mobile device.

An example 10 describes a mobile device according to example 8 or 9, wherein said processor is operable to control said power circuit so that the power circuit provides the smart card with power up to the new maximum power supply value after the smart card accepts the new value.

An example 11 describes a mobile device according to example 1, wherein the processor is operable to change the maximum power value for the smart card without negotiation.

An example 12 describes a smart card operable with a mobile device, comprising:
an interface for interfacing with the mobile device; and
a processor operable to receive a maximum power supply value from the mobile device and operable to make processes run on the smart card within the power range supplied by the mobile device;
wherein said processor is operable to receive a changed maximum power supply value from the mobile device and, in response, is operable to make processes in the smart card run within the new range of power up to the changed maximum power supply value.

An example 13 describes a smart card according to example 12, wherein said processor is operable to renegotiate the change of the maximum power supply level with the mobile device.

An example 14 describes a smart card according to example 13, wherein the renegotiation is initiated by a command received from the mobile device informing the smart card of the changed maximum power supply value.

An example 15 describes a smart card according to example 14, operable to reply to the command accepting the changed maximum power supply value or requesting additional time with the existing maximum power supply value.

An example 16 describes a smart card according to example 13, wherein the renegotiation is initiated by the processor sending the mobile device a request for a new maximum power supply value.

An example 17 describes a smart card according to example 16, wherein the processor is operable to include details of processes to be run on the smart card including an indication of the power demands of each process.

An example 18 describes a smart card according to example 16 or 17, wherein said processor is operable to initiate the renegotiation in response to a change in power consumption demand by processes running or desired to be run on the smart card.

An example 19 describes a smart card according to any one of examples 16 to 18, wherein said processor is operable to initiate the renegotiation in response to a call to terminate an existing process running on the smart card or in response to a call to run a new process on the smart card.

An example 20 describes a smart card according to example 12, operable to receive the changed maximum power supply value in a non-negotiable command from the mobile device and wherein, in response to receiving said non-negotiable command said processor is operable to accept the changed maximum power supply value and to control execution of the processes running on the smart card within the changed power range.

An example 21 describes a method performed by a mobile device, comprising:

defining a maximum power supply value for a smart card associated with the mobile device;

informing the smart card of the maximum power supply value;

controlling power supplied to the associated smart card so that the supplied power does not exceed the defined maximum power supply value;

changing the maximum power supply value for the associated smart card;

informing the associated smart card of the new maximum power supply value; and changing said controlling step so that the power supplied to the associated smart card does not exceed the new maximum power supply value.

An example 22 describes a method according to example 21, further comprising:

renegotiating the new maximum power value with the smart card before the changing.

An example 23 describes a method according to example 22, wherein the mobile device triggers the renegotiation of the maximum power supply value.

An example 24 describes a method according to example 23, further comprising:

monitoring a remaining power level of a battery that provides power to the mobile device;

wherein said triggering is performed in response to the monitored remaining power level of said battery.

An example 25 describes a method according to example 23 or 24, further comprising:

monitoring the operation of the smart card;

wherein said triggering is performed in response to the monitored operation of the smart card.

An example 26 describes a method according to any of examples 23 to 25, further comprising:

receiving a request from the smart card for additional time using the existing maximum power supply value; and granting or denying the requested additional time.

An example 27 describes a method according to example 26, wherein said controlling provides the smart card with power up to the new maximum power supply value after the requested additional time.

An example 28 describes a method according to example 22, wherein said renegotiation is performed in response to a request received from the smart card.

An example 29 describes a method according to example 28, wherein the received request includes details of processes to be run on the smart card and an indication of their power demands and comprising determining whether or not to provide the requested new maximum power supply value in dependence upon the power demands and a remaining power level of a battery that provides power to the mobile device.

An example 30 describes a method according to example 28 or 29, wherein the changing of the controlling is performed after the smart card accepts the new maximum power supply value.

An example 31 describes a method according to example 21, wherein the changing changes the maximum power value for the smart card without negotiation.

An example 32 describes a method performed by a smart card operable with a mobile device, comprising:

receiving a maximum power supply value from the mobile device;

drawing power from the mobile device to run processes on the smart card; and controlling processes on the smart card to make them run within the power range provided by the mobile device;

receiving a changed maximum power supply value from the mobile device; and changing the controlling step so that processes on the smart card can run within the changed power range provided by the mobile device.

An example 33 describes a method according to example 32, further comprising:

renegotiating the change of the maximum power supply level with the mobile device.

An example 34 describes a method according to example 33, wherein the renegotiation is initiated by a command received from the mobile device informing the smart card of the changed maximum power supply value.

An example 35 describes a method according to example 34, further comprising:

replying to the command accepting the changed maximum power supply value or requesting additional time with the existing maximum power supply value.

An example 36 describes a method according to example 33, wherein the renegotiation is initiated by sending the mobile device a request for a new maximum power supply value.

An example 37 describes a method according to example 36, wherein the request includes details of processes to be run on the smart card including an indication of the power demands of each process.

An example 38 describes a method according to example 36 or 37, further comprising:

initiating the renegotiation in response to a change in power consumption demand by processes running or desired to be run on the smart card.

An example 39 describes a method according to any one of examples 36 to 38, further comprising:

initiating the renegotiation in response to a call to terminate an existing process running on the smart card or in response to a call to run a new process on the smart card.

An example 40 describes a method according to example 32, further comprising:

receiving the changed maximum power supply value in a non-negotiable command from the mobile device and, in response accepting the changed maximum power supply value and changing the controlling accordingly.

An example 41 describes a computer implementable instructions product comprising computer implementable instructions for causing a programmable computer device to carry out the method of any one of examples 21 to 40.

An example 42 describes a smart card operable with a mobile device, comprising:

an interface for interfacing with the mobile device; and a processor operable at power up to output an Answer To Reset (ATR) signal to the mobile device, which ATR signal includes a parameter indicating whether or not the smart card can renegotiate a maximum power supply value previously defined by the mobile device and operable to receive a Terminal Capabilities signal from the mobile device indicating whether or not the mobile device can renegotiate said maximum power supply value.

An example 43 describes a mobile device, comprising:

an interface for a smart card;

a processor operable at power up to provide power to the smart card, to receive from the smart card an Answer To Reset (ATR) signal to the mobile device, which ATR signal includes a parameter indicating whether or not the smart card can renegotiate a maximum power supply value previously defined by the mobile device and operable to output a Terminal Capabilities signal to the smart card indicating whether or not the mobile device can renegotiate said maximum power supply value.

An example 44 describes an Answer To Reset (ATR) signal comprising a parameter indicating whether or not a smart card that generated the signal can renegotiate a maximum power supply value previously defined by a mobile device.

An example 45 describes a Terminal Capabilities signal comprising a parameter indicating whether or not a mobile device that generated the signal can renegotiate a maximum power supply value provided from the device to a smart card.

This application is based upon and claims the benefit of priority from United Kingdom patent application No. 0900076.1, filed on Jan. 5, 2009, the disclosure of which is incorporated herein in its entirety by reference.

The invention claimed is:

1. A smart card operable with a mobile device, comprising:
an interface for interfacing with the mobile device; and
a processor operable to receive a maximum power supply value from the mobile device and operable to make processes run on the smart card within the power range supplied by the mobile device;
wherein said processor is operable to receive a changed maximum power supply value from the mobile device and, in response, is operable to make processes in the smart card run within the new range of power up to the changed maximum power supply value,
wherein said processor is operable to dynamically renegotiate the change of the maximum power supply level with the mobile device,
wherein the renegotiation is initiated by the processor sending the mobile device a request for a new maximum power supply value, and
wherein said processor is operable to initiate the renegotiation in response to a call to terminate an existing process running on the smart card or in response to a call to run a new process on the smart card.

2. A smart card according to claim 1, wherein the renegotiation is initiated by a command received from the mobile device informing the smart card of the changed maximum power supply value.

3. A smart card according to claim 2, operable to reply to the command accepting the changed maximum power supply value or requesting additional time with the existing maximum power supply value.

4. A smart card according to claim 1, wherein the processor is operable to include details of processes to be run on the smart card including an indication of the power demands of each process.

5. A smart card according to claim 1, wherein said processor is operable to initiate the renegotiation in response to a change in power consumption demand by processes running or desired to be run on the smart card.

6. A smart card according to claim 1, operable to receive the changed maximum power supply value in a non-negotiable command from the mobile device and wherein, in response to receiving said non-negotiable command said processor is operable to accept the changed maximum power supply value and to control execution of the processes running on the smart card within the changed power range.

7. A method performed by a smart card operable with a mobile device, comprising:
receiving a maximum power supply value from the mobile device;
drawing power from the mobile device to run processes on the smart card;
controlling processes on the smart card to make them run within the power range provided by the mobile device;
receiving a changed maximum power supply value from the mobile device;
changing the controlling step so that processes on the smart card can run within the changed power range provided by the mobile device; and
renegotiating the change of the maximum power supply level with the mobile device,
wherein the renegotiation is dynamically performed in response to a request received from the smart card, the renegotiation being initiated in response to a call to terminate an existing process running on the smart card or in response to a call to run a new process on the smart card.

8. A method according to claim 7, wherein the renegotiation is initiated by a command received from the mobile device informing the smart card of the changed maximum power supply value.

9. A method according to claim 8, further comprising:
replying to the command accepting the changed maximum power supply value or requesting additional time with the existing maximum power supply value.

10. A method according to claim 7, wherein the request includes details of processes to be run on the smart card including an indication of the power demands of each process.

11. A method according to claim 7, further comprising:
initiating the renegotiation in response to a change in power consumption demand by processes running or desired to be run on the smart card.

12. A method according to claim 7, further comprising:
receiving the changed maximum power supply value in a non-negotiable command from the mobile device and, in response accepting the changed maximum power supply value and changing the controlling accordingly.

13. A computer implementable instructions product comprising computer implementable instructions on a non-transitory computer readable medium for causing a programmable computer device to carry out the method of claim 7.

* * * * *

UNITED STATES PATENT AND TRADEMARK OFFICE
CERTIFICATE OF CORRECTION

PATENT NO.         : 8,700,940 B2  
APPLICATION NO.    : 13/142778  
DATED              : April 15, 2014  
INVENTOR(S)        : Olivier Dong Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 84 days.

Signed and Sealed this

Twenty-ninth Day of September, 2015

Michelle K. Lee  
*Director of the United States Patent and Trademark Office*